(12) United States Patent
Altman et al.

(10) Patent No.: US 7,979,682 B2
(45) Date of Patent: Jul. 12, 2011

(54) METHOD AND SYSTEM FOR PREVENTING LIVELOCK DUE TO COMPETING UPDATES OF PREDICTION INFORMATION

(75) Inventors: Erik R. Altman, Danbury, CT (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/051,322

(22) Filed: Mar. 19, 2008

(65) Prior Publication Data

US 2008/0313445 A1     Dec. 18, 2008

Related U.S. Application Data

(63) Continuation of application No. 11/440,554, filed on May 25, 2006, now abandoned.

(51) Int. Cl.
*G06F 9/30*     (2006.01)
(52) U.S. Cl. .......................................... 712/225; 711/204
(58) Field of Classification Search .................. None
See application file for complete search history.

(56) References Cited

U.S. PATENT DOCUMENTS

| | | | |
|---|---|---|---|
| 4,063,220 A | 12/1977 | Metcalfe et al. | |
| 5,210,838 A | 5/1993 | Jensen | |
| 5,392,410 A | 2/1995 | Liu | |
| 5,485,589 A | 1/1996 | Kocis et al. | |
| 5,896,522 A * | 4/1999 | Ward et al. | 703/23 |
| 5,900,022 A | 5/1999 | Kranich | |
| 5,956,752 A * | 9/1999 | Mathews | 711/204 |
| 6,138,225 A | 10/2000 | Upton et al. | |
| 6,157,980 A * | 12/2000 | Arimilli et al. | 711/3 |
| 2002/0184430 A1* | 12/2002 | Ukai et al. | 711/3 |
| 2005/0125628 A1* | 6/2005 | Morrow et al. | 711/204 |
| 2007/0050601 A1 | 3/2007 | Chaudhry et al. | |

FOREIGN PATENT DOCUMENTS

EP     182501 A2 *     5/1986

OTHER PUBLICATIONS

Tanenbaum (Structured Computer Organization: Third Edition); Prentice-Hall, Inc; 1990; 5 pages.*
Metcalfe et al., "Ethernet: Distributed packet Switching for Local Computer Networks", Jul. 1976, ACM, vol. 19, No. 7, pp. 395-404.

* cited by examiner

*Primary Examiner* — Eddie P Chan
*Assistant Examiner* — Keith Vicary
(74) *Attorney, Agent, or Firm* — Yee & Associates, P.C.; William Stock (57) ABSTRACT

A system to prevent livelock. An outcome of an event is predicted to form an event outcome prediction. The event outcome prediction is compared with a correct value for a datum to be accessed. An instruction is appended with a real event outcome when the outcome of the event is mispredicted to form an appended instruction. A prediction override bit is set on the appended instruction. Then, the appended instruction is executed with the real event outcome.

19 Claims, 5 Drawing Sheets

FIG. 7

METHOD AND SYSTEM FOR PREVENTING LIVELOCK DUE TO COMPETING UPDATES OF PREDICTION INFORMATION

This application is a continuation of application Ser. No. 11/440,554, filed May 25, 2006, status abandoned.

This invention was made with Government support under Contract No.: NBCH3039004 awarded by Defense Advanced Research Projects Agency (DARPA). The Government has certain rights in this invention.

BACKGROUND OF THE INVENTION

1. Field of the Invention

The present invention relates generally to an improved data processing system. More specifically, the present invention is directed to a computer implemented method, apparatus, and computer useable program code to prevent livelock created by competing updates of event outcome prediction information.

2. Description of the Related Art

Computer processors and other data processing systems sometimes find that event outcome prediction expedites the processing of data. Later, if the event outcome prediction is proven to be incorrect, these systems recover from the mispredictions. Then, these systems use the actual event outcome to update a prediction mechanism, such as a history-based hardware predictor table, in order to have a better chance of making correct event outcome predictions in the future.

However, this approach to event outcome prediction correction may lead to "livelock" in some prediction systems. Livelock is an endless loop in program execution that occurs when a process repeats itself because the process continues to receive erroneous information. For example, one event, or set of events, identified as A, serves to counter-act the forward progress of another event, or set of events, identified as B. Likewise, B serves to counter-act the forward progress of A.

Assume that events A and B only make forward progress if they receive a successful event outcome prediction from the prediction mechanism. Furthermore, assume an erroneous event outcome prediction puts in motion a sequence of actions that updates the prediction mechanism so that the next time the system executes the event, the event receives a correct prediction and is able to proceed forward. Using the two assumptions above in an example, the system executes event A, which receives an erroneous event outcome prediction from the prediction mechanism and then the system executes event B, which also receives an erroneous event outcome prediction. In this situation where both events A and B receive an erroneous event outcome prediction, it is possible for the system to update the prediction mechanism for event B prior to the system re-executing event A. The updates to the prediction mechanism for event B may serve to overwrite, or undo, the updates to the prediction mechanism for event A.

Consequently, when the system tries to re-execute event A, event A once again receives a wrong event outcome prediction. This second wrong event outcome prediction for event A occurs because after the system updated the prediction mechanism for event A, and before the system re-executes event A, the system updates the prediction mechanism for event B destroying event A's updates. Then, the updates to the prediction mechanism for the re-execution of event A destroy the updates to the prediction mechanism for the re-execution of event B.

As a result, event B also receives a wrong event outcome prediction when the system re-executes event B. Thus, any forward progress in the system for events A and B comes to a standstill because of the resultant livelock. This livelock situation may continue forever or until a user stops the system due to frustration with the lack of forward progress.

One known solution to livelock is exponential back-off. Exponential back-off is an algorithm that uses feedback to multiplicatively decrease the rate of some process, in order to gradually find an acceptable rate. Exponential back-off is often used in network congestion avoidance to help determine the correct sending rate. In a livelock situation, upon incurring an event outcome misprediction, the event waits a random amount of time before trying again. If the event fails a second time, the event waits a longer random amount of time. If the event fails a third time, the event waits an even longer random amount of time and so on.

As these exponential back-offs continue, the probability that two conflicting events will keep conflicting rapidly drops toward zero. Therefore, this exponential back-off mechanism serves to disentangle two conflicting events. However, in a computer processor this exponential back-off solution is impractical for at least two reasons. First, no simple mechanism currently exists to calculate the random back-offs required for the event. Second, processor performance may significantly degrade due to increasing time intervals between event execution.

A second known solution to this livelock problem is to use a livelock detection counter. The livelock detection counter detects when an event is repeatedly executing. After the livelock detection counter reaches a predetermined threshold for execution of the event, the livelock detection counter assumes that livelock exists within the system, even if there is not, because it may be impossible to know for sure whether livelock actually exists. When the livelock detection counter assumes that there is livelock, the system executes one event at a time in a very simple mode until the system is reasonably confident that the livelocking events have passed. Like the previous approach above, this approach may significantly degrade computer processor performance due to slowing execution of events to one-at-a-time until livelock no longer exists within the system.

A variation to the second approach above is to introduce pipeline stalls, or bubbles, in the system when livelock is determined. Thus, when the first event re-executes after a livelock condition has been detected, the first event does not wait for an event outcome prediction, but delays execution until the correct value is computed. Here again, accurately detecting a livelock situation is expensive.

A more sophisticated version of the second approach above may be to actually identify the conflicting events causing livelock and delay execution of one of the events until the other event has completed. This approach still may degrade computer processor performance, although probably not as much as with the previously mentioned approaches. However, this approach is more expensive in terms of memory area and processor cycles used for implementation. Also, it is more difficult to validate that this approach works in all cases.

A variation of the immediately preceding approach is to lock an event outcome prediction after updating the prediction mechanism for the first executing event of a livelocking pair of events. Thus, the next time the first event executes, the first event receives the correct value and is no longer in a livelock condition with the second event. Accurately detecting this livelock condition is a problem as with the other approaches. In addition, locking event outcome predictions may create a problem if a third event executes and interrupts the normal event execution flow within the system. Any such third event must then check for locked event outcome predictions and release them.

Another known approach is to assign random event outcome predictions for a brief period when apparent livelock is detected. If the set of possible values for the event outcome prediction is small, this approach is likely to let one or both conflicting events pass, thus, resolving the livelock condition. However, using this approach may once again degrade computer processor performance during the period of assigning random event outcome predictions.

Therefore, it would be beneficial to have an improved computer implemented method, system, and computer useable program code to prevent livelock created by competing updates of event outcome prediction information.

SUMMARY OF THE INVENTION

Illustrative embodiments provide a computer implemented method, system, and computer useable program code to prevent livelock. An outcome of an event is predicted to form an event outcome prediction. The event outcome prediction is compared with a correct value for a datum to be accessed. An instruction is appended with a real event outcome when the outcome of the event is mispredicted to form an appended instruction. A prediction override bit is set on the appended instruction. Then, the appended instruction is executed with the real event outcome.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
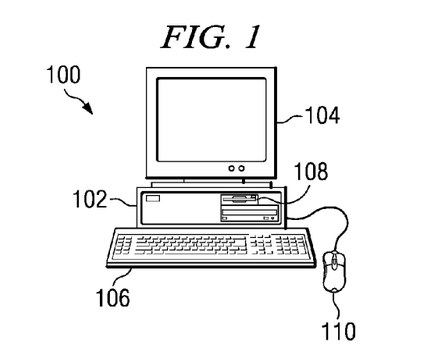
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
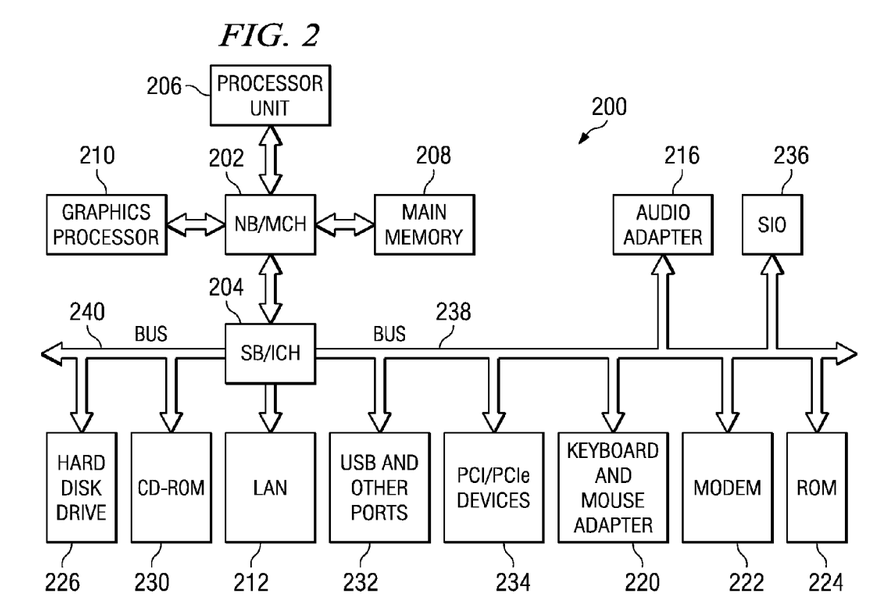
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as computer 100 in FIG. 1, in which code or instructions implementing the processes of the illustrative embodiments may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, apparatus, and computer usable program code for compiling source code. The methods for the depicted embodiments may be performed in a data processing system, such as data processing system 100 shown in FIG. 1 or data processing system 200 shown in FIG. 2.

Illustrative embodiments provide a computer implemented method, system, and computer useable program code to prevent livelock created by competing updates of event outcome prediction information. A load/store execution unit reads a load instruction to access a datum using an address generation unit in response to receiving the instruction from an instruction decode and dispatch unit. In response to reading the instruction, the address generation unit generates an effective address of the datum to be accessed. The effective address is used to determine which data row contains the desired datum to be accessed within a data cache memory. The load/store execution unit utilizes an effective-to-real address translator to translate the effective address to a real address of the datum to be accessed. The real address is used to determine which data column contains the desired datum to be accessed within the row associated with the effective address. The load/store execution unit then accesses the desired datum using the real address. In addition, the load/store execution unit employs a set-predict array to predict the correct column address of the datum to be accessed within the data cache memory.

Further, the load/store execution device uses a comparator to compare the real column address outcome with the predicted column address outcome to determine if the prediction was correct or mispredicted. If the set-predict array mispredicts the column address, then the load/store execution unit rejects the instruction by sending the rejected instruction back to the instruction decode and dispatch unit. In addition, the load/store execution unit utilizes the output of the comparator to update the set-predict array with the correct column address after a misprediction. Furthermore, the load/store execution unit appends the rejected instruction with the real column address and a prediction mechanism override bit. The prediction mechanism override bit is used to override the set-predict array prediction mechanism during re-execution of the rejected instruction.

Using illustrative embodiments the load/store execution unit re-executes the rejected instruction by overriding the set-predict array prediction mechanism and using the real column address to guarantee execution of the instruction. In other words, any instruction event, whose outcome was mispredicted during the first execution, is guaranteed to execute correctly on the second attempt. As a result, illustrative embodiments eliminate the need for an expensive livelock detection mechanism and allow conflicting events to make forward progress without creating a livelock condition within the load/store execution unit.

Figure 3:
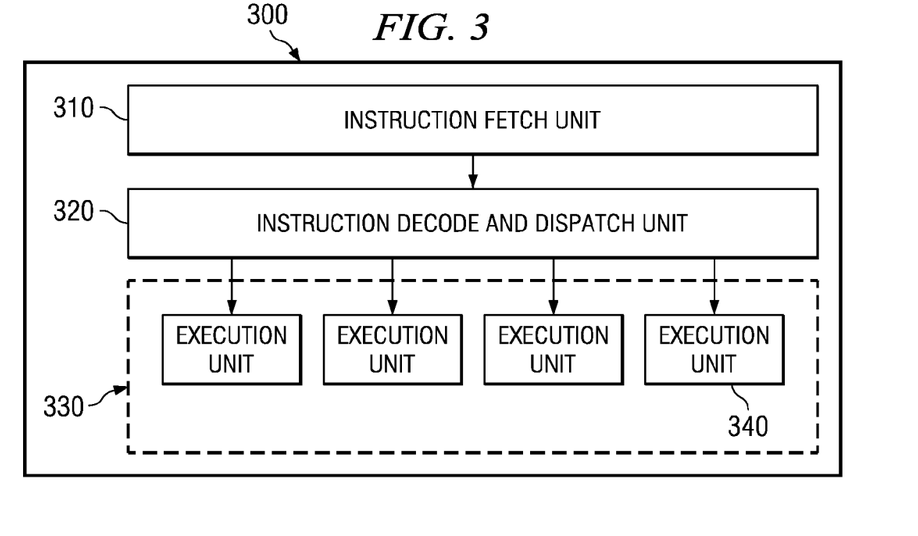
FIG. 3 is a block diagram of a data processing system that includes one or more execution units in accordance with an illustrative embodiment.

With reference now to FIG. 3, a block diagram of a data processing system that includes one or more execution units is depicted in accordance with an illustrative embodiment. Data processing system 300 may, for example, be implemented by data processing system 200 in FIG. 2. Data processing system 300 may comprise, for example, instruction fetch unit 310, instruction decode and dispatch unit 320, and execution unit set 330. However, it should be noted that data processing system 300 is only intended for exemplary purposes and not meant as an architectural limitation to illustrative embodiments. Data processing system 300 may include any necessary components to perform processes of illustrative embodiments.

Execution unit set 330 may include one or more execution units. In this particular example, execution unit set 330 includes 4 execution units. An execution unit is part of a central processing unit (CPU), such as, for example, processor unit 206 in FIG. 2, and performs operations and calculations called for by a program or application. An execution unit may include an internal control sequence unit, some registers, and other more specific components. A register is a small amount of very fast computer memory used to speed the execution of programs and applications by providing quick access to commonly used values that are typically in the midst of an operation or calculation at a given point in time. Most modern computer architectures operate on the principle of moving data or instructions from a main memory, such as, for example, main memory 208 in FIG. 2, into registers, operate on the data or execute the instructions, then move the data or instructions back into the main memory. This principle in modern computer architecture is known as a load/store architecture. Also, it is commonplace for modern CPUs to have multiple parallel execution units, such as execution unit set 330. Typically, one execution unit manages a memory interface, while the other execution units perform other operations.

Data processing system 300 utilizes instruction fetch unit 310 to fetch an instruction from the main, or instruction, memory and to forward the fetched instruction to instruction decode and dispatch unit 320. Data processing system 300 uses instruction decode and dispatch unit 320 to decode bits of the instruction and to assign the decoded instruction to an appropriate execution unit within execution unit set 330 for execution. The assigned execution unit within execution unit set 330 performs the operations of the decoded instruction. This process is known as a fetch/execute, or fetch/decode/execute, cycle.

In an illustrative embodiment, data processing system 300 may use, for example, one execution unit, such as execution unit 340 within execution unit set 330, to execute load/store instructions. Consequently, execution unit 340 may be referred to as a load/store execution unit. However, it should be noted that illustrative embodiments are not restricted to the use of one execution unit as a load/store execution unit. Illustrative embodiments may employ one or more execution units within execution unit set 330 to execute load/store instructions. An illustrative example of a load/store execution unit is depicted in FIG. 4 below.

Figure 4:
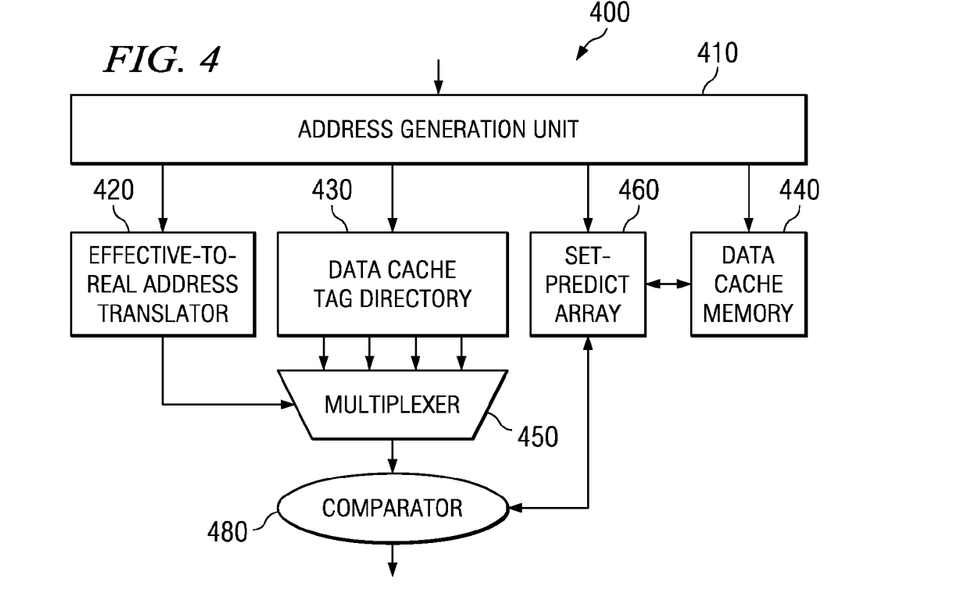
FIG. 4 is a block diagram of an execution unit utilized as a load/store unit in accordance with an illustrative embodiment.

With reference now to FIG. 4, a block diagram of an execution unit utilized as a load/store unit is depicted in accordance with an illustrative embodiment. Load/store execution unit 400 may be, for example, execution unit 340 in FIG. 3. A CPU, such as processing unit 206 in FIG. 2, uses load/store execution unit 400 to execute a program's or application's load/store instructions.

Load/store execution unit 400 includes address generation unit 410, effective-to-real address translator 420, data cache tag directory 430, and data cache memory 440. Load/store execution unit 400 utilizes address generation unit 410 to receive the load instruction from an instruction decode and dispatch unit, such as, for example, instruction decode and dispatch unit 320 in FIG. 3, and to read the source operands of the load instruction. An operand is a value on which the instruction operates. For example, the operand may be a processor register, a memory address, a literal constant, or a label. In this particular example, address generation unit 410 reads the instruction operands to determine an effective address of the datum to be accessed.

An address is a number of a particular memory or peripheral storage location. Like post office boxes, each byte of memory and each disk sector has its own unique address. Programs and applications are compiled into machine language, which reference actual addresses in a data processing system. In this particular example, the effective address is used to determine the row address of the desired datum to be accessed in data cache memory 440.

Load/store execution unit 400 uses effective-to-real address translator 420 to translate the effective row address of the datum to be accessed to a real address. A real address is an explicit identification of a memory location. In this illustrative example, the real address is used to identify the column address of the datum to be accessed within the determined row address.

Load/store execution unit 400 may employ, for example, data cache tag directory 430 to store the real addresses of the data and data cache memory 440 to store the data to be accessed during execution of instructions corresponding to these real addresses. Data cache tag directory 430 and data cache memory 440 organize stored data in rows and columns. However, it should be noted that illustrative embodiments are not limited to storing data within data cache tag directory 430 and data cache memory 440 in rows and columns. Data cache tag directory 430 and data cache memory 440 may use any type of data storage scheme that allows processes of illustrative embodiments to properly function. Also, it should be noted that the data stored within data cache tag directory 430 and data cache memory 440 are organized and located in the same row number and the same column number. In other words, data cache tag directory 430 and data cache memory 440 have a one-to-one mapping of the addresses and the data to be accessed.

Address generation unit 410 supplies the effective address, which determines the row address of the datum to be accessed in both data cache tag directory 430 and data cache memory 440. Load/store execution unit 400 utilizes multiplexer 450 to, for example, collect all data columns in data cache tag directory 430 for the effective row address supplied by address generation unit 410. After effective-to-real address translator 420 determines the real column address of the desired datum to be accessed, multiplexer 450 utilizes the real column address to access the desired datum from the earlier collected data columns from data cache tag directory 430.

Load/store execution unit 400 also includes set-predict array 460. Load/store execution unit 400 uses set-predict array 460 as a history of the columns accessed within the rows of data cache memory 440. For example, load/store execution unit 400 may use set-predict array 460 to store data concerning the most recently accessed columns within data cache memory 440. In addition, load/store execution unit 400 also utilizes set-predict array 460 as a prediction mechanism to predict the column address of the datum to be accessed in data cache memory 440. By predicting the column address that holds the desired datum to be accessed in data cache memory 440, set-predict array 460 expedites, or accelerates, the process of accessing the desired datum. Access to the desired datum is expedited by predicting the column address because set-predict array 460 does not wait for effective-to-real address translator 420 to determine the real column address before accessing the desired datum. Using the column prediction of set-predict array 460 and the row address determined from the effective address supplied by address generation unit 410, load/store execution unit 400 may access the desired datum within data cache memory 440 without waiting for the real address.

Subsequent to accessing the desired datum from data cache tag directory 430 and data cache memory 440, load/store execution unit 400 utilizes comparator 480 to determine if the prediction made by set-predict array 460 is a correct prediction of the column number of the desired datum accessed in data cache memory 440. To determine a correct prediction, comparator 480 compares the correct column number of the desired datum outcome in multiplexer 450 with the predicted column number of the desired datum outcome in data cache memory 440. A correct column prediction outcome by set-predict array 460 is one that matches the real column address outcome in multiplexer 450.

If the column prediction is the same as the real column address, load/store execution unit 400 continues execution of the instruction until completion. If the column prediction is not the same as the real column address, which in this example is known as a misprediction, load/store execution unit 400 rejects the instruction causing the misprediction and sends the mispredicted instruction back to the instruction decode and dispatch unit for re-execution by load/store execution unit 400 in the future. Further, load/store execution unit 400 may, for example, use the output of comparator 480 to update set-predict array 460 with the correct real column address outcome if the column prediction is mispredicted.

However, load/store execution unit 400 may execute another instruction prior to re-executing the mispredicted instruction causing the newly executed instruction to be mispredicted by set-predict array 460. This cycle of mispredicting instructions causes livelock to occur in a load/store execution unit that is not utilizing processes of an illustrative embodiment. An exemplary illustration of livelock and its correction by illustrative embodiments is discussed in the detailed description of FIG. 5 below.

FIG. 4 is only intended as an example and not as an architectural limitation for different illustrative embodiments. The hardware in FIG. 4 may vary depending on the implementation and modifications may be made without departing from the spirit and scope of illustrative embodiments. Other internal hardware or peripheral devices may be used in addition to or in place of the hardware depicted in FIG. 4.

Figure 5:
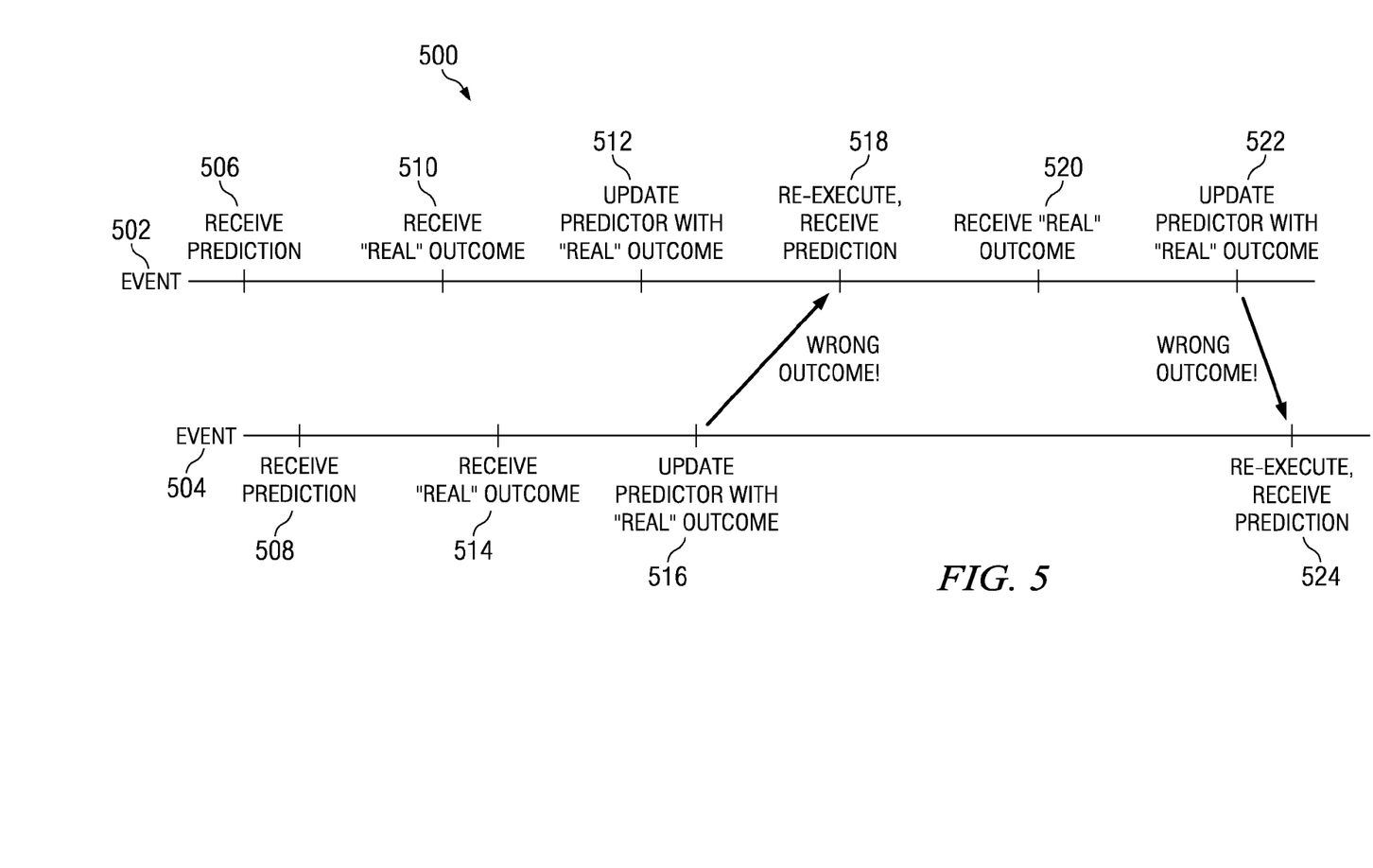
FIG. 5 is a specific example of livelock in accordance with an illustrative embodiment.

With reference now to FIG. 5, a specific example of livelock is depicted in accordance with an illustrative embodiment. Livelock example 500 includes execution of instructions for the occurrence of event 502 and event 504 within a load/store execution unit, such as, for example, load/store execution unit 400 in FIG. 4. However, it should be noted that illustrative embodiments are not restricted to the occurrence of only two events. The occurrence of two or more events in a livelock condition is anticipated by illustrative embodiments.

In livelock example 500, the forward progress of event 502 counter-acts the forward progress of event 504. Likewise, the forward progress of event 504 counter-acts the forward progress of event 502. Thus, forward progress of event 502 and event 504 are at a standstill in livelock example 500. Event 502 and event 504 may make forward progress only when event 502 and event 504 receive a correct column prediction for the datum to be accessed from, for example, a set-predict array prediction mechanism, such as set-predict array 460 in FIG. 4.

In livelock example 500, event 502 and event 504 are, for example, load instructions to be executed in the load/store execution unit in a data processing system, such as data processing system 300 in FIG. 3. Even though event 502 and event 504 are different events, event 502 and event 504 desire to access data within the same row of a data cache memory, such as, for example, data cache memory 440 in FIG. 4.

In livelock example 500, event 502 executes first followed by event 504. Subsequently, event 502 receives a column prediction for the datum to be accessed from the set-predict array first at time 506 and then event 504 receives a column prediction for the datum to be accessed at time 508. In this illustrative example, both column predictions for the datum to be accessed by event 502 and event 504 are mispredicted by the set-predict array. As a result of the column mispredictions, event 502 receives a real column address outcome for the datum to be accessed at time 510 from, for example, the output of a comparator, such as comparator 480 in FIG. 4. In addition, the output of the comparator is used to update the set-predict array, or the prediction mechanism, with the real column address outcome at time 512. Likewise, event 504 receives a real column address outcome for the datum to be accessed at time 514 and the set-predict array is updated with the real column address outcome at time 516. Then, the load/store execution unit rejects the mispredicted instructions for event 502 and event 504 and sends the mispredicted instruction back to an instruction decode and dispatch unit, such as, for example, instruction decode and dispatch unit 320 in FIG. 3, for re-execution at a later time.

Because an update to the set-predict array for event 504 occurs at time 516, which is after the update for event 502 at time 512, the set-predict array overwrites the update for event 502 at time 512 with the update for event 504 at time 516. Consequently, when the load/store execution unit re-executes event 502 at time 518, event 502 once again receives a wrong column number outcome, or a misprediction, because update of the real column address to the set-predict array for event 504 replaced the update of the real column address for event 502. Subsequently, event 502 receives the real column address from the output of the comparator at time 520. Afterward, the comparator updates the set-predict array with the real column address outcome for event 502 at time 522. Then, the load/store execution unit rejects the load instruction for event 502 and sends the load instruction back to the instruction decode and dispatch unit for future re-execution.

Because an update to the set-predict array for event 502 occurs at time 522, which is after the update for event 504 at time 516, the set-predict array overwrites the update for event 504 at time 516 with the update for event 502 at time 522. Consequently, when the load/store execution unit re-executes event 504 at time 524, event 504 once again receives a wrong column address because the update of the real column address outcome to the set-predict array for event 502 replaced the real column address outcome update for event 504. As a result, the load/store execution unit rejects the load instruction for event 504 and sends the load instruction back to the instruction decode and dispatch unit for future re-execution. Therefore, the load/store execution unit makes no forward progress in event 502 or event 504 causing livelock to occur in the load/store execution unit.

Illustrative embodiments overcome this livelock condition by providing a process for appending to, or saving with, the mispredicted load instruction, the real column outcome, which is the correct column number of the datum to be accessed. Moreover, illustrative embodiments also append to the mispredicted load instruction a single bit to indicate that during re-execution of this load instruction the set-predict array prediction mechanism is overridden and the appended real column address is used instead. This single bit appended to the mispredicted instruction may be, for example, equal to 1. It should be noted that even though in this particular example the real column outcome and the prediction mechanism override bit are appended to the mispredicted load instruction for re-execution, the real column outcome and prediction mechanism override bit may be, for example, stored separately and associated with the mispredicted load instruction.

This process of saving the real column address outcome and the set-predict array override bit with the mispredicted load instruction guarantees that during re-execution of the mispredicted load instruction the load instruction receives the correct column number holding the datum to be accessed and, therefore, execution of the load instruction proceeds to completion. Consequently, illustrative embodiments prevent livelock by guaranteeing execution of the mispredicted load instruction during re-execution by overriding the prediction mechanism and using the correct column number to access the desired datum.

Figure 6:
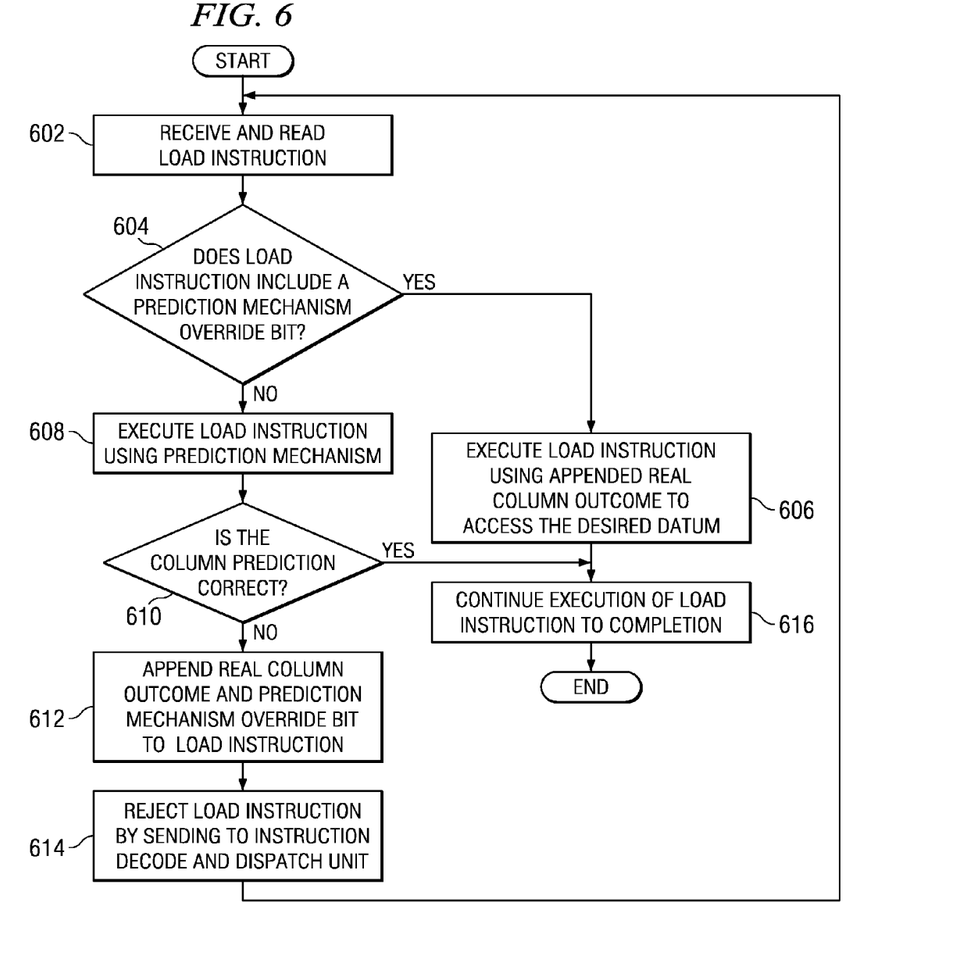
FIG. 6 is a flowchart illustrating an exemplary process for a load/store unit to prevent livelock created by competing updates of event outcomes in accordance with an illustrative embodiment.

With reference now to FIG. 6, a flowchart illustrating an exemplary process for a load/store unit to prevent livelock created by competing updates of event outcomes is depicted in accordance with an illustrative embodiment. The process depicted in FIG. 6 may be implemented in a load/store execution unit, such as, for example, load/store execution unit 400 in FIG. 4.

The process begins when the load/store execution unit receives a load instruction from an instruction decode and dispatch unit, such as, for example, instruction decode and dispatch unit 320 in FIG. 3, and then reads the load instruction (step 602). The load/store execution unit may use, for example, an address generation unit, such as address generation unit 410 in FIG. 4, to receive and read the load instruction. After receiving and reading the load instruction, the load/store execution unit makes a determination as to whether the load instruction includes a prediction mechanism override bit (step 604). If the load instruction does include a prediction mechanism override bit, yes output of step 604, then the load/store execution unit executes the load instruction using an appended real column outcome to the load instruction, which contains the correct column address to access the desired datum (step 606). Thereafter, the process proceeds to step 616 where the load/store execution unit continues to execute the load instruction until completion.

If the load instruction does not include a prediction mechanism override bit, no output of step 604, then the load/store execution unit executes the load instruction using a prediction mechanism (step 608). Exemplary steps illustrating the process of the prediction mechanism of step 608 are described in FIG. 7 below. The load/store execution unit performs the steps illustrated in FIG. 7 prior to the process proceeding to step 610.

Subsequent to executing the load instruction using the prediction mechanism in step 608, the load/store execution unit uses, for example, a comparator, such as comparator 480 in FIG. 4, to make a determination as to whether the set-predict array column prediction is correct (step 610). If the comparator determines that the set-predict array column address prediction matches the real column address outcome, then the set-predict array column address prediction is correct. If the comparator determines that the set-predict array column address prediction does not match the real column address outcome, then the set-predict array column address prediction is not correct or mispredicted.

If the set-predict array column address prediction is not correct, no output of step 610, then the load/store execution unit appends the mispredicted load instruction with the real column address outcome and a prediction mechanism override bit (step 612). Subsequent to appending the mispredicted load instruction in step 612, the load/store execution unit rejects the mispredicted load instruction by sending the load instruction back to the instruction decode and dispatch unit for re-execution in the future (step 614). Thereafter, the process returns to step 602 where the load/store execution unit once again receives and reads the load instruction. If the set-predict array column address prediction is correct, yes output of step 610, then the load/store execution unit continues to execute the load instruction to completion (step 616). The process terminates thereafter.

Figure 7:
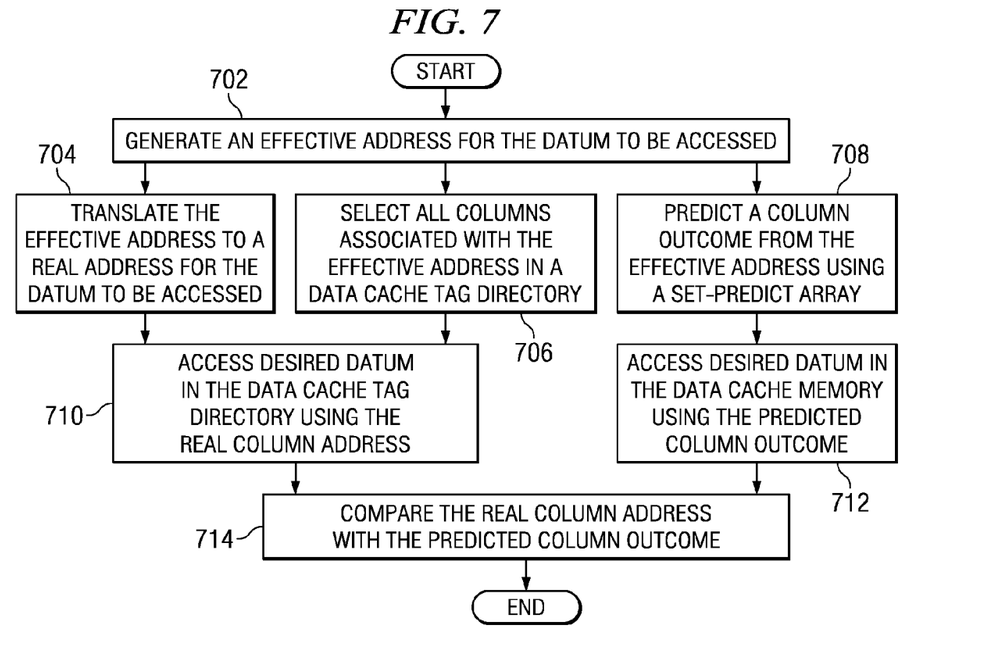
FIG. 7 is a flowchart illustrating an exemplary process for executing a load instruction using a prediction mechanism in accordance with an illustrative embodiment.

With reference now to FIG. 7, a flowchart illustrating an exemplary process for executing a load instruction using a prediction mechanism is depicted in accordance with an illustrative embodiment. The process depicted in FIG. 7 may be implemented in a load/store execution unit, such as for example, load/store execution unit 400 in FIG. 4. In addition, this exemplary prediction mechanism process relates to step 608 in FIG. 6.

The process begins when the load/store execution unit utilizes an address generation unit, such as, for example, address generation unit 410 in FIG. 4, to generate an effective address for a datum to be accessed from the source operands of a load instruction (step 702). The effective address identifies the row address of the datum to be accessed in a memory device that stores data in rows and columns. The memory device may be, for example, a data cache tag directory and a data cache memory, such as data cache tag directory 430 and data cache memory 440 in FIG. 4.

Subsequent to the address generation unit generating the effective address of the datum to be accessed in step 702, the load/store execution unit utilizes, for example, an effective-to-real address translator, such as effective-to-real address translator 420 in FIG. 4, to translate the effective row address of the datum to be accessed to a real address (step 704). The real address is used to determine the column address of the datum to be accessed within the identified effective row address. Also, the load/store execution unit selects all columns in the row associated with the effective address in the data cache directory (step 706).

Further, the load/store execution unit uses a prediction mechanism, such as a set-predict array to predict a column address outcome within the row associated with the effective address (step 708). The set-predict array may be, for example, set-predict array 460 in FIG. 4. It should be noted that even though in this particular example a set-predict array is used as the prediction mechanism, illustrative embodiments may utilize any prediction mechanism capable of performing processes of prediction.

The set-predict array stores data concerning the most recently accessed columns within the data cache memory. Using this stored column data, the set-predict array predicts the column address of the datum to be accessed in data cache memory. By predicting the column that holds the desired datum to be accessed in the data cache memory, the set-predict array expedites the process of accessing the desired datum by not waiting for the effective-to-real address translator to determine the real, or correct, column address of the datum to be accessed.

In addition, it should be noted that the load/store execution unit simultaneously performs steps 704, 706, and 708. After concurrently translating the effective address to a real address in step 704 and selecting all columns associated with the row in the effective address in step 706, the load/store execution unit utilizes, for example, a multiplexer, such as multiplexer 450 in FIG. 4, to access the desired datum from the data cache tag directory using the real column address (step 710). The multiplexer collects all the columns in the row associated with the effective address in the data cache tag directory. Then, the multiplexer utilizing the real column address provided by the effective-to-real address translator, accesses the desired datum from the data cache tag directory.

Subsequent to predicting the column address outcome in step 708, the load/store execution unit accesses the desired datum in the data cache memory using the predicted column address (step 712). After determining the desired column in the data cache tag directory using the real column address in step 710 and accessing the desired datum in the data cache memory using the predicted column address in step 712, the load/store execution unit uses, for example, a comparator, such as comparator 480 in FIG. 4, to compare the real column address outcome with the predicted column address outcome for a match (step 714). The process terminates thereafter. However, it should be noted that even though the exemplary prediction mechanism process of FIG. 7 terminates at this point, the overall load instruction execution process continues by returning to step 610 in FIG. 6 where the load/store execution unit makes a determination as to whether the column prediction is correct.

Thus, illustrative embodiments provide a computer implemented method, system, and computer useable program code to prevent livelock created by competing updates of event outcome information. The invention can take the form of an entirely hardware embodiment, an entirely software embodiment or an embodiment containing both hardware and software elements. In a preferred embodiment, the invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system to prevent livelock, the computer implemented method comprising:
   determining, by a processor, whether a prediction mechanism override bit for overriding a prediction mechanism is set in an instruction;
   responsive to the prediction mechanism override bit being set in the instruction, overriding the prediction mechanism so that the prediction mechanism does not predict a column address in a data cache memory for a datum to be accessed for the instruction;
   executing, by the processor, the instruction using a correct column address that is appended to the instruction to access the datum in the data cache memory, wherein the correct column address and the prediction mechanism override bit are appended to the instruction in response to determining that an outcome of an event was mispredicted using a predicted column address during a previous execution of the instruction; and
   rejecting, by the processor, the instruction by sending the instruction with an appended correct column address and an appended prediction mechanism override bit back to an instruction decode and dispatch unit for re-execution at a later time in response to determining that the outcome of the event was mispredicted using the predicted column address.

2. The computer implemented method of claim 1, further comprising:
   responsive to receiving an instruction to access the datum, reading the instruction;
   responsive to reading the instruction, generating an effective address of the datum to be accessed;
   translating the effective address to a real address of the datum to be accessed; and
   accessing the datum using the real address.

3. The computer implemented method of claim 2, wherein the determining, overriding, executing, reading, generating, translating, accessing, and rejecting steps are executed in an execution unit within the processor.

4. The computer implemented method of claim 3, wherein the execution unit is a load/store execution unit.

5. The computer implemented method of claim 3, wherein the execution unit uses a set-predict array to predict the column address in the data cache memory for the datum to be accessed, and wherein the execution unit uses a comparator to compare the predicted column address with the real address.

6. The computer implemented method of claim 2, wherein the instruction is a load instruction, and wherein the event is execution of the load instruction.

7. The computer implemented method of claim 6, wherein the load instruction includes source operands, and wherein the source operands provide the effective address of the datum to be accessed.

8. The computer implemented method of claim 2, wherein the real address of the datum to be accessed is stored in a data cache tag directory, and wherein the datum to be accessed is stored in the data cache memory, and wherein the data cache tag directory and the data cache memory store data in rows and columns, and wherein the data cache tag directory and the data cache memory have a same number of rows and columns.

9. The computer implemented method of claim 2, wherein the effective address is used to determine a row address in the data cache memory of the datum to be accessed, and wherein the real address is used to determine the column address in the data cache memory of the datum to be accessed.

10. The computer implemented method of claim 1, wherein a real event outcome is the correct column address in the data cache memory for the datum to be accessed.

11. The computer implemented method of claim 1, wherein a mispredicted event is an incorrect column address prediction for the datum to be accessed.

12. The computer implemented method of claim 1, wherein the prediction mechanism override bit is set to one, and wherein when the prediction mechanism override bit is set to one the prediction mechanism does not predict the column address in the data cache memory for the datum to be accessed during execution of the instruction.

13. A data processing system to prevent livelock, comprising:
   a bus system;
   a storage device connected to the bus system, wherein the storage device includes stores a set of instructions; and
   a hardware processing unit connected to the bus system, wherein the hardware processing unit executes the set of instructions to determine whether a prediction mechanism override bit for overriding a prediction mechanism is set in an instruction; override the prediction mechanism so that the prediction mechanism does not predict a column address in the data cache memory for a datum to be accessed for the instruction in response to the prediction mechanism override bit being set in the instruction; execute the instruction using a correct column address that is appended to the instruction to access the datum in the data cache memory, wherein the correct column address and the prediction mechanism override bit are appended to the instruction in response to determining that an outcome of an event was mispredicted using a predicted column address during a previous execution of the instruction; and reject the instruction by sending the instruction with an appended correct column address and an appended prediction mechanism override bit back to an instruction decode and dispatch unit for re-execution at a later time in response to determining that the outcome of the event was mispredicted using the predicted column address.

14. The data processing system of claim 13, wherein the hardware processing unit executes a further set of instructions to read an instruction to access the datum in response to receiving the instruction, generate an effective address of the datum to be accessed in response to reading the instruction, translate the effective address to a real address of the datum to be accessed, and access the datum using the real address.

15. The data processing system of claim 14, wherein the hardware processing unit includes one or more execution units.

16. A computer program product to prevent livelock, the computer program product comprising:
a non-transitory computer usable medium having computer usable program code embodied therein, the computer usable medium comprising:
computer usable program code configured to determine whether a prediction mechanism override bit for overriding a prediction mechanism is set in an instruction;
computer usable program code configured to override the prediction mechanism so that the prediction mechanism does not predict a column address in the data cache memory for a datum to be accessed for the instruction in response to the prediction mechanism override bit being set in the instruction;
computer usable program code configured to execute the instruction using a correct column address that is appended to the instruction to access the datum in the data cache memory, wherein the correct column address and the prediction mechanism override bit are appended to the instruction in response to determining that an outcome of an event was mispredicted using a predicted column address during a previous execution of the instruction; and
computer usable program code configured to reject the instruction by sending the instruction with an appended correct column address and an appended prediction mechanism override bit back to an instruction decode and dispatch unit for re-execution at a later time in response to determining that the outcome of the event was mispredicted using the predicted column address.

17. The computer program product of claim 16, further comprising:
computer usable program code configured to read an instruction to access the datum in response to receiving the instruction;
computer usable program code configured to generate an effective address of the datum to be accessed in response to reading the instruction;
computer usable program code configured to translate the effective address to a real address of the datum to be accessed; and
computer usable program code configured to access the datum using the real address.

18. The computer program product of claim 17, wherein an execution unit executes the computer usable program code configured to determine whether a prediction mechanism override bit for overriding a prediction mechanism is set in an instruction, the computer usable program code configured to override the prediction mechanism so that the prediction mechanism does not predict a column address in the data cache memory for a datum to be accessed for the instruction in response to the prediction mechanism override bit being set in the instruction, the computer usable program code configured to execute the instruction using a correct column address that is appended to the instruction to access the datum in the data cache memory, the computer usable program code configured to read the instruction to access the datum in response to receiving the instruction, the computer usable program code configured to generate the effective address of the datum to be accessed in response to reading the instruction, the computer usable program code configured to translate the effective address to the real address of the datum to be accessed, the computer usable program code configured to access the datum using the real address, and the computer usable program code configured to reject the instruction by sending the instruction with an appended correct column address and an appended prediction mechanism override bit back to an instruction decode and dispatch unit for re-execution at a later time in response to determining that the outcome of the event was mispredicted using the predicted column address.

19. The computer program product of claim 17, wherein the instruction is a load instruction, and wherein the event is execution of the load instruction.

\* \* \* \* \*